Dec. 18, 1962 K. HEHL 3,068,520
INJECTION MOLDING MACHINE
Filed Aug. 25, 1960 11 Sheets-Sheet 1
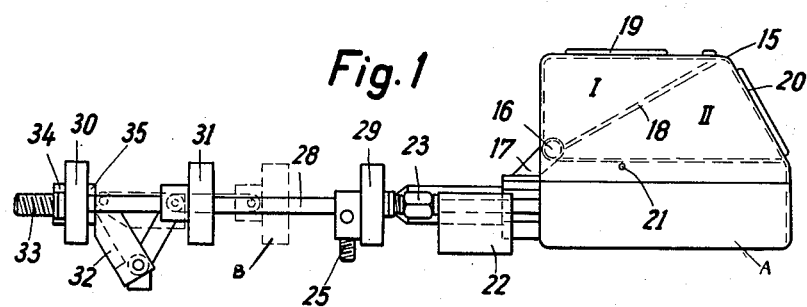
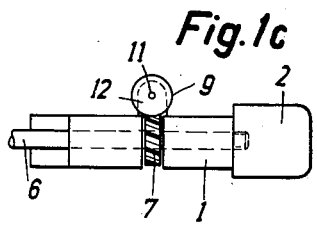
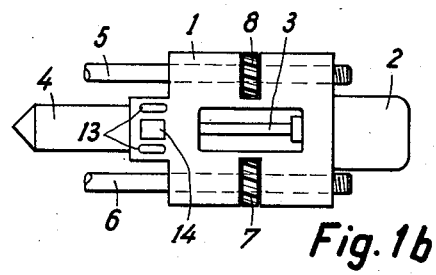
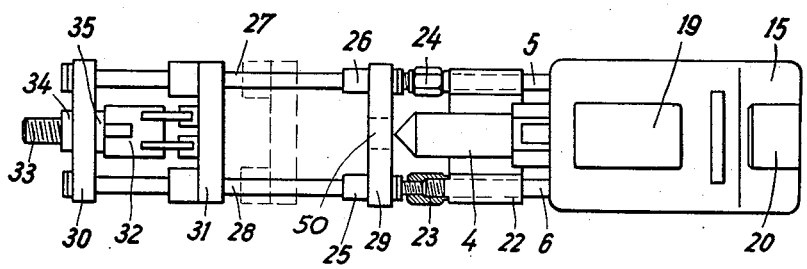
Inventor:
KARL HEHL
By: George W. Spencer
attorney

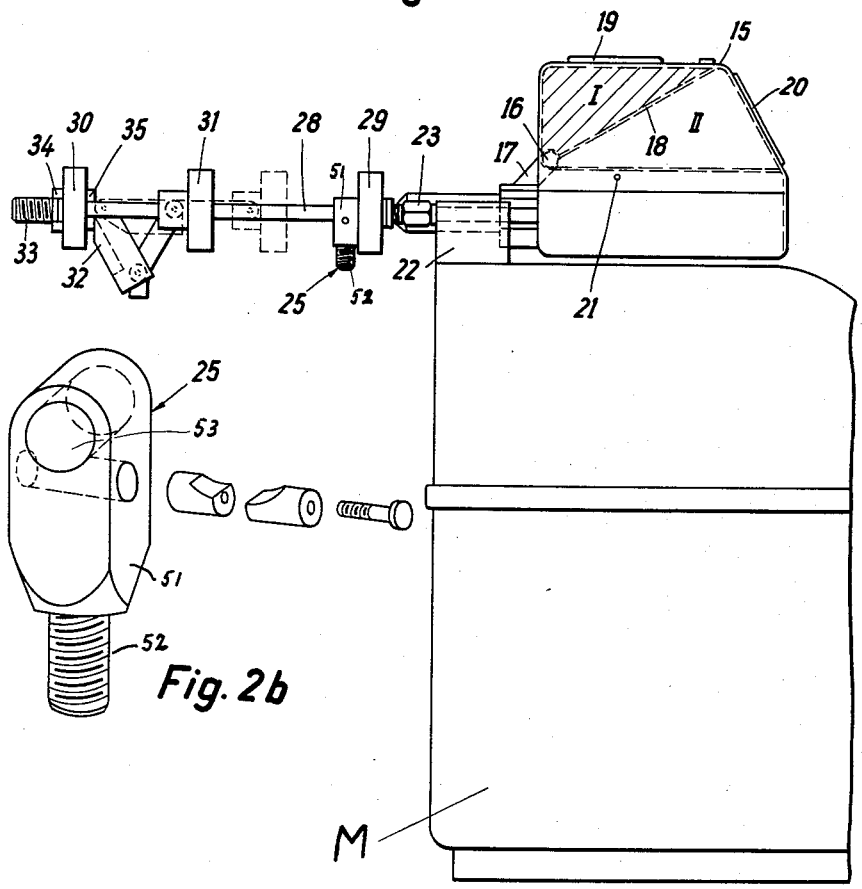

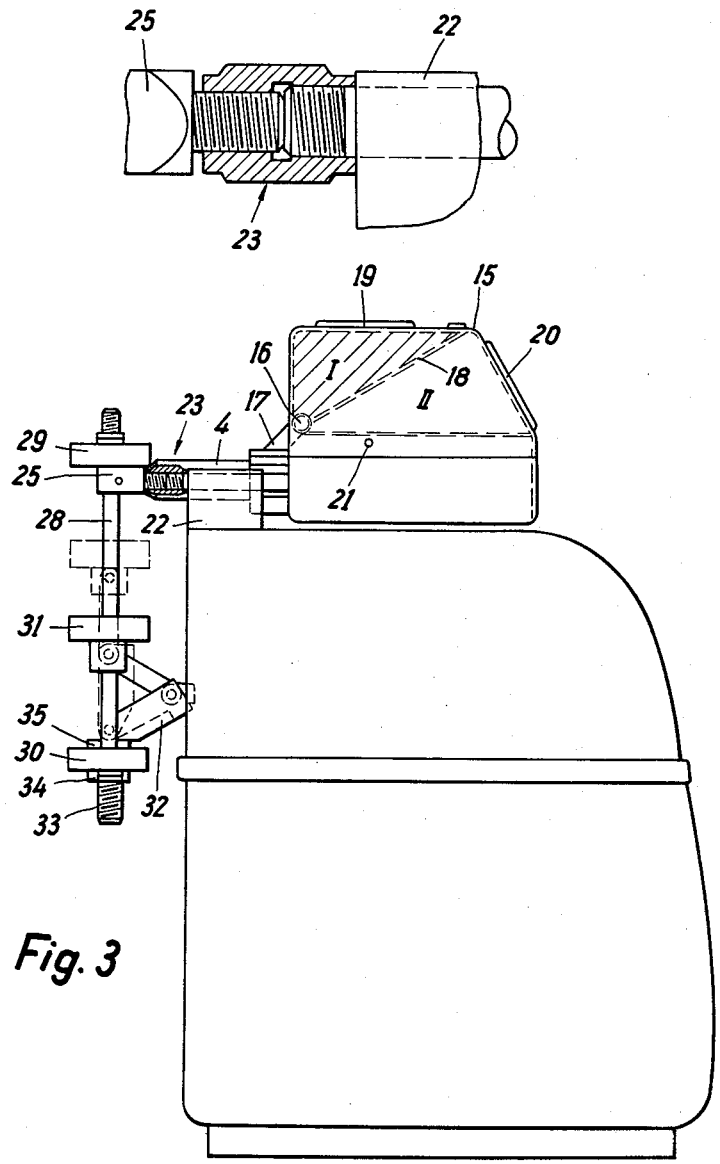

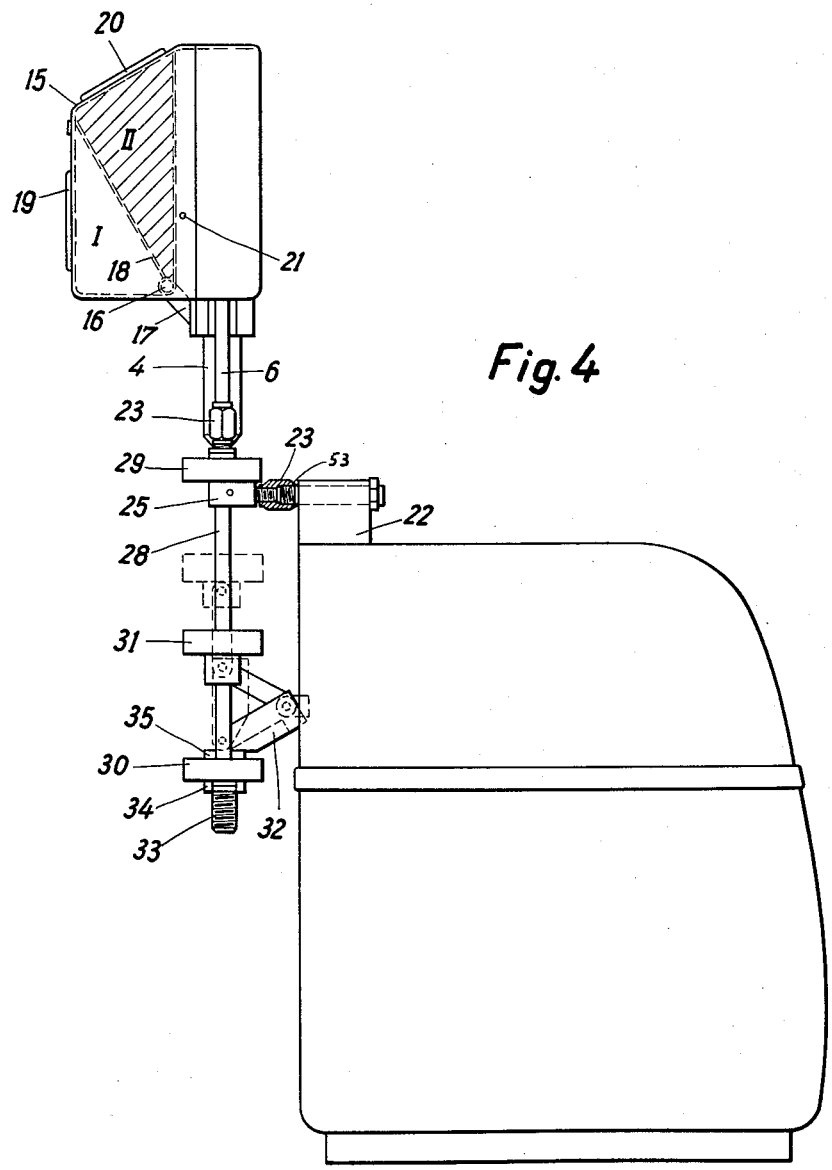

Dec. 18, 1962 K. HEHL 3,068,520
INJECTION MOLDING MACHINE
Filed Aug. 25, 1960 11 Sheets-Sheet 7

Inventor:
KARL HEHL
By: George H. Spencer
Attorney

Dec. 18, 1962 K. HEHL 3,068,520
INJECTION MOLDING MACHINE
Filed Aug. 25, 1960 11 Sheets-Sheet 8

Inventor:
KARL HEHL
By: George U Spencer
Attorney

Dec. 18, 1962     K. HEHL     3,068,520

INJECTION MOLDING MACHINE

Filed Aug. 25, 1960     11 Sheets-Sheet 9

Inventor:
KARL HEHL
By: George U Spencer
attorney

Dec. 18, 1962 K. HEHL 3,068,520
INJECTION MOLDING MACHINE
Filed Aug. 25, 1960 11 Sheets-Sheet 10

Inventor:
KARL HEHL
By: George U Spencer
Attorney

United States Patent Office 3,068,520
Patented Dec. 18, 1962

3,068,520
INJECTION MOLDING MACHINE
Karl Hehl, Lossburg, Wurttemberg, Germany, assignor to Arburg-Feingeraetefabrik oHG., Hehl & Söhne, Lossburg, Wurttemberg, Germany
Filed Aug. 25, 1960, Ser. No. 51,886
Claims priority, application Germany Jan. 29, 1960
7 Claims. (Cl. 18—30)

The present invention relates to an injection molding machine and, more particularly, to an injection molding machine capable of selectively positioning a mold clamping assembly and/or an injection casting assembly in a horizontal position or in a vertical position. Furthermore, the present invention makes possible changing the mold clamping assembly and/or injection casting assembly from a horizontal to a vertical position or vice versa without the time consuming operations which are characteristic of prior art devices.

It is highly important in practical injection molding operations to have a machine which is capable of being adjusted quickly to optimum arrangements of mold clamping assemblies and injection casting assemblies which give the most satisfactory results for particular types of casting operations.

The requiremests for various types of casting operations are different. For instance, in the manufacture of radially symmetrical castings which have metallic members embedded therein (e.g., a gear), the optimum operating conditions favor a vertical arrangement of the injection assembly and a vertical arrangement of the mold clamping assembly. This is necessary because an exact locating of the metallic member in the desired position of the radially symmetrical casting (the center) is only possible if the metallic member to be embedded is held in position in the injection casting mold by gravity. This is not possible in a horizontal arrangement of the mold.

In those cases where it is desired to prepare a radially symmetrical casting which has a high degree of concentricity, e.g. precision gears, the best results are obtained by casting through an opening in a clamping platen of the casting assembly. In such a casting, the plastic material is introduced through an opening in the injection casting mold which lies in the center of one face of a section of casting mold and thereby at the center of the casting to be made. (Contrast this with injection through an opening in he mold located at the parting line when both halves of the mold are brought together.)

The type of injection casting discussed above, because of the introduction of the plastic material at the middle point of the radially symmetrical casting, results in a casting of maximum smoothness and uniform distribution of stresses and maximum contraction.

In preparing a non-symmetrical casting, in which a metal insert is to be embedded, the optimum results are attained by a horizontal orientation of the injection assembly and a vertical orientation of the mold clamping assembly. The vertical disposition of the clamping assembly is necessary since, as described above, the metal part must be held in position by gravity.

In preparing radial symmetrical castings which do not have a metal insert embedded therein, the optimum results are obtained by a horizontal arrangement of the injection casting assembly and a horizontal arrangement of the clamping assembly. The best results are obtained by injection through an opening in the platen in the clamping assembly and through an opening in a face of one section of the mold.

For preparing castings which are non-symmetrical and in which no metal insert is embedded, the best results are obtained with a vertical arrangement of the injection casting assembly and a horizontal arrangement of the clamping assembly. Optimum injection is obtained by casting through an opening in the mold which is on a parting line between the halves of the mold.

The casting art also requires a convenient assembly which allows for simultaneous or sequential injection of thermoplastic materials of different colors into the casting.

To adequately satisfy the needs of this art, it is clear that the injection casting machine must be of such a character as to enable quick and convenient changes of the injection casting assembly and mold clamping assembly between vertical and horizontal positions. For better casting results in an arrangement of the type contemplated, it is advantageous for casting material feeding means always to be maintained in a horizontal position, regardless of the positions of the injection casting assembly or the mold clamping assembly.

It is accordingly an object of the present invention to provide an injection casting machine which is sufficiently adaptable that the clamping assembly and/or the injection casting assembly may readily be arranged in a vertical and/or a horizontal position.

It is a further object of the present invention to provide an injection casting machine having casting material feeding means which is always maintained in a horizontal position, regardless of the positions of the mold clamping assembly or the injection casting assembly.

Other and more detailed objects will be apparent from the following description and drawings in which the same numbers represent like parts in the various views and in which:

FIGURE 1 is a side elevation of a device embodied in the present invention, showing the casting assembly jointed to the mold clamping assembly, the base of the casting machine not being shown;

FIGURE 1a is a top plan view of the machine shown in FIGURE 1;

FIGURE 1b is a partial top plan view of the injection casting assembly of FIGURE 1 with the granular material storage chambers removed;

FIGURE 1c is a side elevation of the portion of the machine shown in FIGURE 1b;

FIGURE 2 is a side elevation of a device similar to FIGURE 1 and showing the attachment of the injection casting assembly to the base of the machine, both the casting assembly and mold clamping assembly being arranged in a horizontal position;

FIGURE 2b is an enlarged perspective view of element 25 shown in FIGURE 2;

FIGURE 3 is a side elevation partly in section of the machine shown in FIGURE 2, wherein the injection casting assembly is arranged horizontally and the mold clamping assembly is arranged vertically;

FIGURE 3b is a partial enlarged view of the connecting means (partly in section) shown in FIGURE 3, whereby the injection casting assembly is joined to the mold clamping assembly;

FIGURE 4 is a side elevation of the machine of FIGURE 2, showing the injection casting assembly and mold clamping assembly in a vertical position, an adaptor being employed to secure the whole vertically arranged assembly to the base of the casting machine;

Figure 2A:
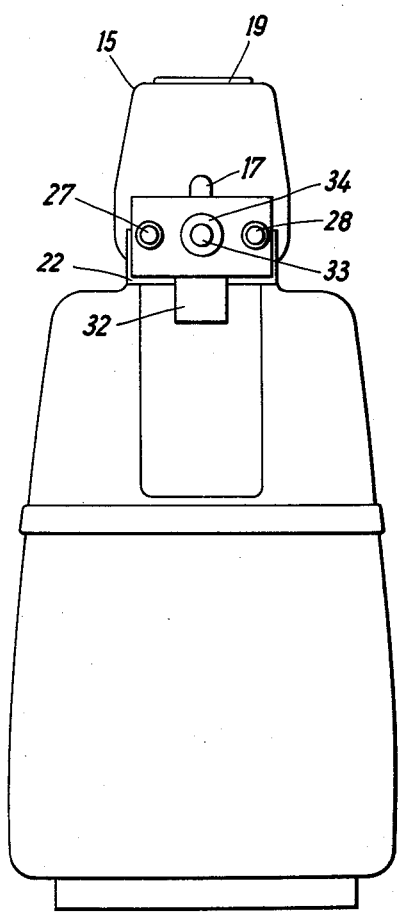
FIGURE 2a is a front end elevation of the machine of FIGURE 2.

Referring in detail to the drawings and, particularly, to FIGURES 1, 1a, 1b and 1c thereof, the injection casting assembly is designated generally at A, whereas the mold clamping assembly is designated at B. The injection casting assembly A comprises carriage member 1 on which is mounted a granule storage bin 15. The thermoplastic material to be cast is usually supplied in granular form and is stored in bin 15.

Also mounted on one side of the carriage 1 is hydraulic or pneumatic cylinder 2 and on the other side plasticizing cylinder 4. Piston 3 which is operated by pneumatic or hydraulic cylinder 2 serves to eject the thermoplastic casting material which is made plastic by plasticizing cylinder 4. The carriage 1 is also provided with an opening 14 through which granular casting material is dropped from the granule feeding means, described in more detail later, into the plasticizing cylinder 4.

Channels 13 surrounding the plasticizing cylinder 4 serves as a means of conducting a heat exchange medium which heats or cools the thermoplastic material as the needs require. The carriage 1 is supported and secured to the base of machine M by a U-shaped support means 22. The upstanding legs of the U-shaped member 22 are each provided with a central bore through which pass rods 5 and 6, respectively. Rods 5 and 6 are securely fastened to the U-shaped support member 22.

Carriage 1 is mounted for movement in the direction of its long axis on rods 5 and 6 by means of gears 7 and 8. Gears 7 and 8 contain an internal thread which co-operates with corresponding threads on rods 5 and 6. Rods 5 and 6 pass through a central opening in gears 7 and 8. Gears 7 and 8 are caused to rotate around an axis parallel to the long axis of the casting assembly by means of worm gears 9 and 10 arranged at right angles to gears 7 and 8. (Gear 10 is not illustrated.)

In FIGURE 1b, gears 9 and 10 and their supporting and driving means have been removed so that the details of gears 7 and 8 and their relationships to the other parts of the device can be seen in plain view.

Gears 9 and 10 are mounted on axle 11 supported on a bearing 12 which is secured to carriage 1.

Axle 11 is rotated by means of a crank (not shown) which is introduced through the opening 21 of the housing of the casting assembly. By rotating the crank, axle 11 and worm gears 9 and 10 are rotated around an axis which is perpendicular to the long axis of the injection casting assembly. By virtue of their meshing with gears 7 and 8, which are arranged at right angles thereto, worm gears 9 and 10 rotate gears 7 and 8 around axes which are parallel to the long axis of the injection casting assembly. The rotation of gears 7 and 8 by virtue of their internal threads moves carriage 1 back and forth along stationary rods 5 and 6.

Granular storage chamber 15 is divided into sections I and II by partition 18. The granular material to be cast is fed from sections I or II to the horizontally extending feeding or metering pipe 16 and then to delivery channel 17 to opening 14 and then into the plasticizing cylinder 4. By this arrangement, the feeding pipe 16 is always in a horizontal position, regardless of the position of the injection casting assembly. In the horizontal working position of the injection casting assembly, the granular material is fed from section I. In the vertical operating position of the injection casting assembly, the granular material is supplied from section II.

Filling of granule storage section I is effected by removing cover 19, whereas the filling of the granule storage section II is effected by the removal of cover 20.

The mold clamping assembly B comprises a front stationary platen 29, provided with a central opening 50 shown in dotted line in FIGURE 1a, a back stationary platen 30 and an intermediate movable platen 31. Platen 31 is mounted for forward and backward movement on rods 27 and 28. Mold platen 31 is moved by means of toggle linkages 32 and pressure spindle 33 when necessary. By means of stop nuts 34 and 35, it is possible to arrest the spindle in any particular position.

Secured near the front end of the mold clamping assembly and behind the front platen 29 there are mounted a pair of connecting elements 25 and 26 which serve to mount the clamping assembly in various positions with respect to the casting assembly. A detailed view of such an element is given in FIGURE 2b and it comprises a body portion 51 from which extends a lug 52. Body portion 51 is provided with a bore 53 through which passes one of the guide rods 27 or 28. Elements 25 and 26 are secured to rods 27 and 28 by clamping means shown to the right of FIGURE 2b. Lug 52 provides a means by which the mold clamping assembly may be secured to the casting assembly using nuts 23 and 24, described in more detail below (see FIGURE 3). Another function of lug 52 is shown in FIGURE 4, wherein it serves to maintain both the casting assembly and the clamping assembly in a vertical position in nuts 23 and 24 and adaptor 53. (See FIGURE 4.) Nuts 23 and 24 are provided to make possible the universal cooperation between the injection assembly and the mold clamping assembly. A detailed view of this connection is shown in FIGURE 3b. The coupling nuts 23 and 24 are detachable and may be used to join the casting assembly to the clamping assembly in the various mutual relationships discussed above. With their help, it is possible to inject through the opening 50 in platen 29 of the mold clamping assembly (in the horizontal arrangement of the mold clamping assembly) and through the mold opening directly when the clamping assembly is in a position normal with respect to the casting assembly. In operating in the vertical position of the clamping assembly, nuts 23 and 24 are used to join elements 25 and 26 to rods 5 and 6. Operating in the horizontal position, they serve to secure the extension of rods 28 and 29 to rods 5 and 6.

Figure 3A:
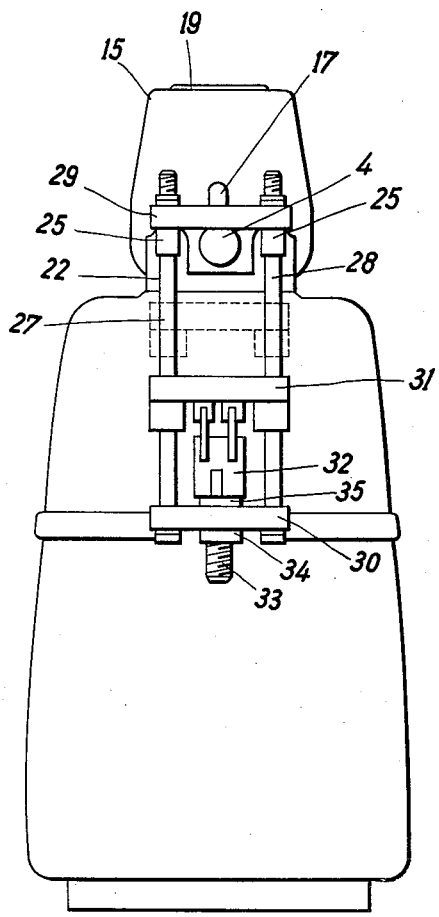
FIGURE 3a is a front end view of the machine of FIGURE 3.
Figure 5:
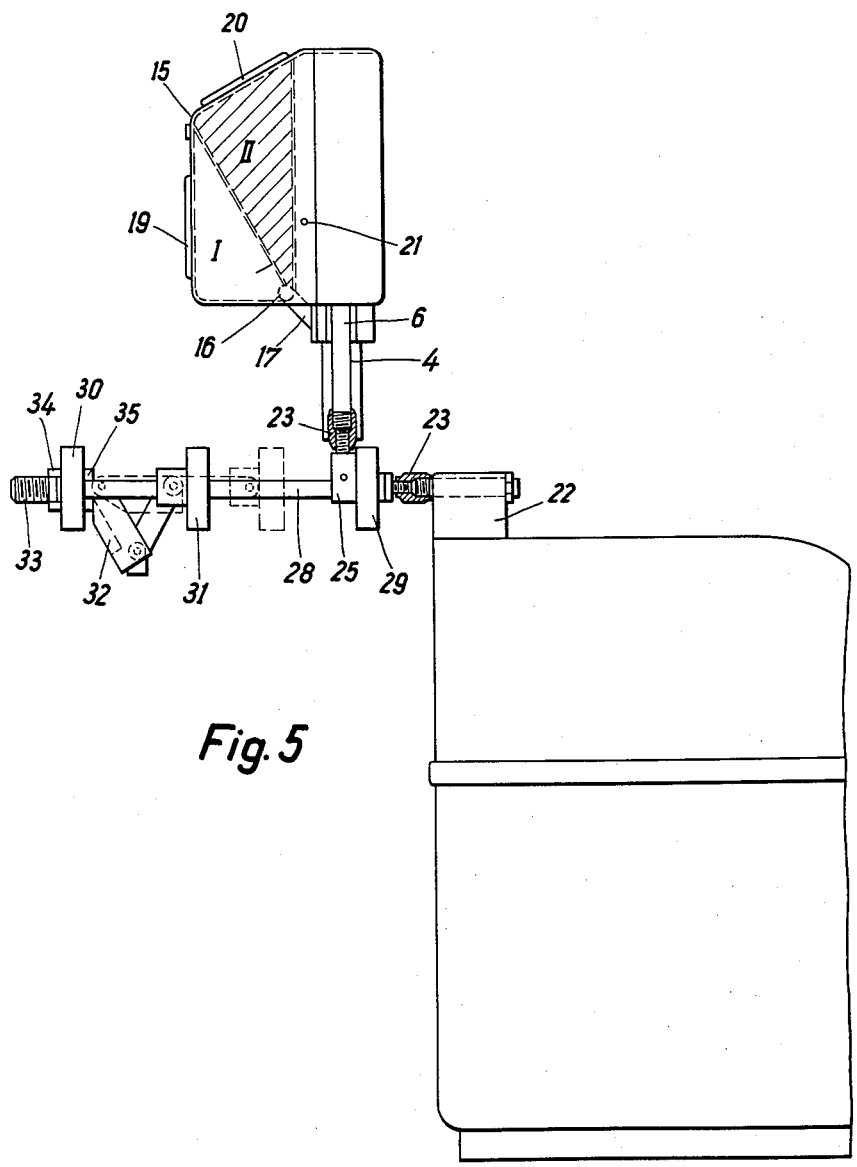
FIGURE 5 is a view similar to that shown in FIGURE 4, except that the injection casting assembly is arranged in a vertical position, whereas the mold clamping assembly is arranged in a horizontal position.

It is to be noted as illustrated in FIGURES 2 and 4 that, regardless of the various positions of the injection casting assembly, the feeding pipe 16 is always in a horizontal position. (The granular storage section, e.g., I or II, operating at the particular time is shown by cross-hatching in the drawings.)

It is further to be noted that the feeding mechanism, regardless of the working position of the casting assembly, is controlled by the same means (piston).

By means of the present invention, it has been made possible for the first time to change the machine in a short period of time to the vertical operating position of the injection casting assembly or to the horizontal position thereof. Likewise, the mold clamping means can be quickly changed to the vertical or horizontal position. The above positioning is possible without the addition of a new element. The following four working positions are available which make possible a selection of the most advantageous working position for any casting operation:

(a) A horizontal position for the injection casting assembly and a horizontal position for the mold clamping assembly (FIGURE 2).

(b) A horizontal position for the injection casting assembly and a vertical position of the mold clamping assembly (FIGURE 3).

(c) A vertical position of the injection casting assembly and a vertical position of the mold clamping assembly (FIGURE 4).

(d) A vertical position of the injection casting assembly and a horizontal position of the mold clamping assembly.

Figure 6:
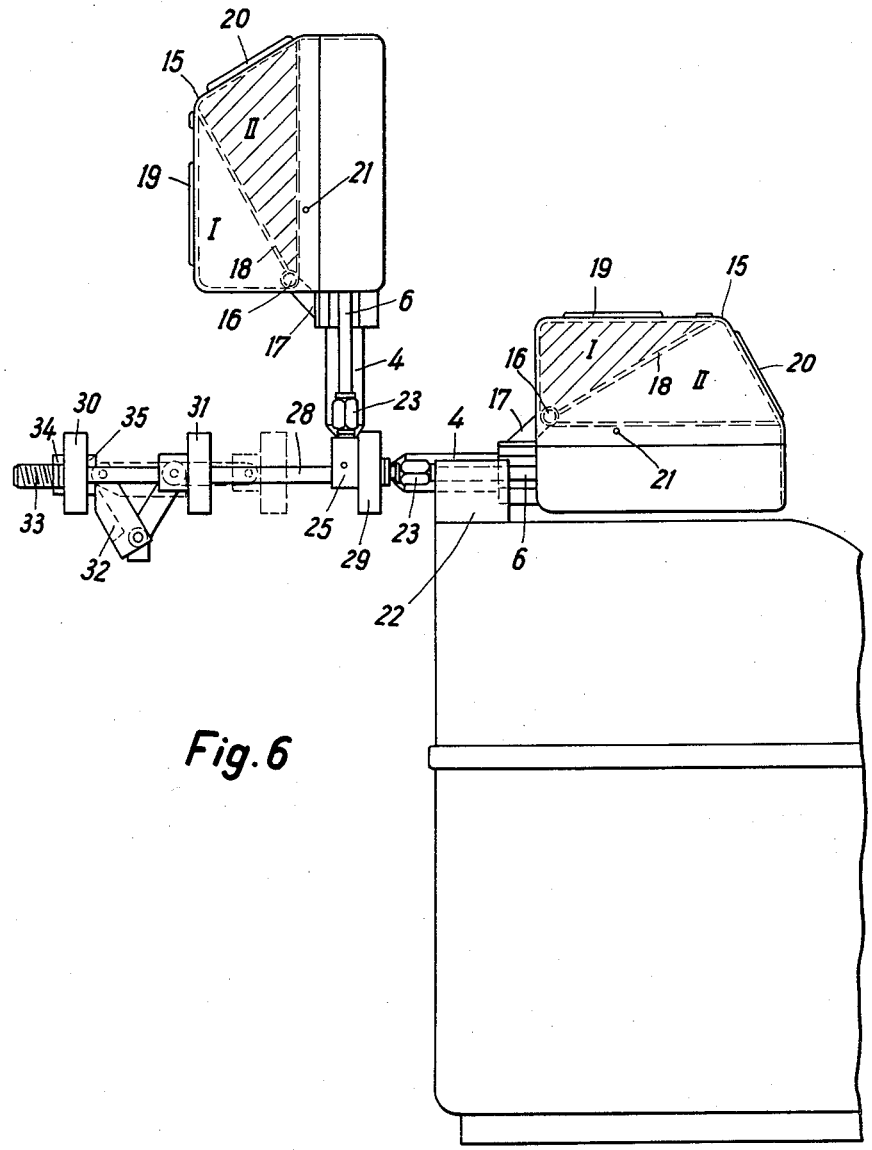
FIGURE 6 is a side elevation of the machine shown in FIGURE 2, wherein two injection casting assemblies are mounted for operation, one in a vertical direction and one mounted in a horizontal direction.
Figure 7:
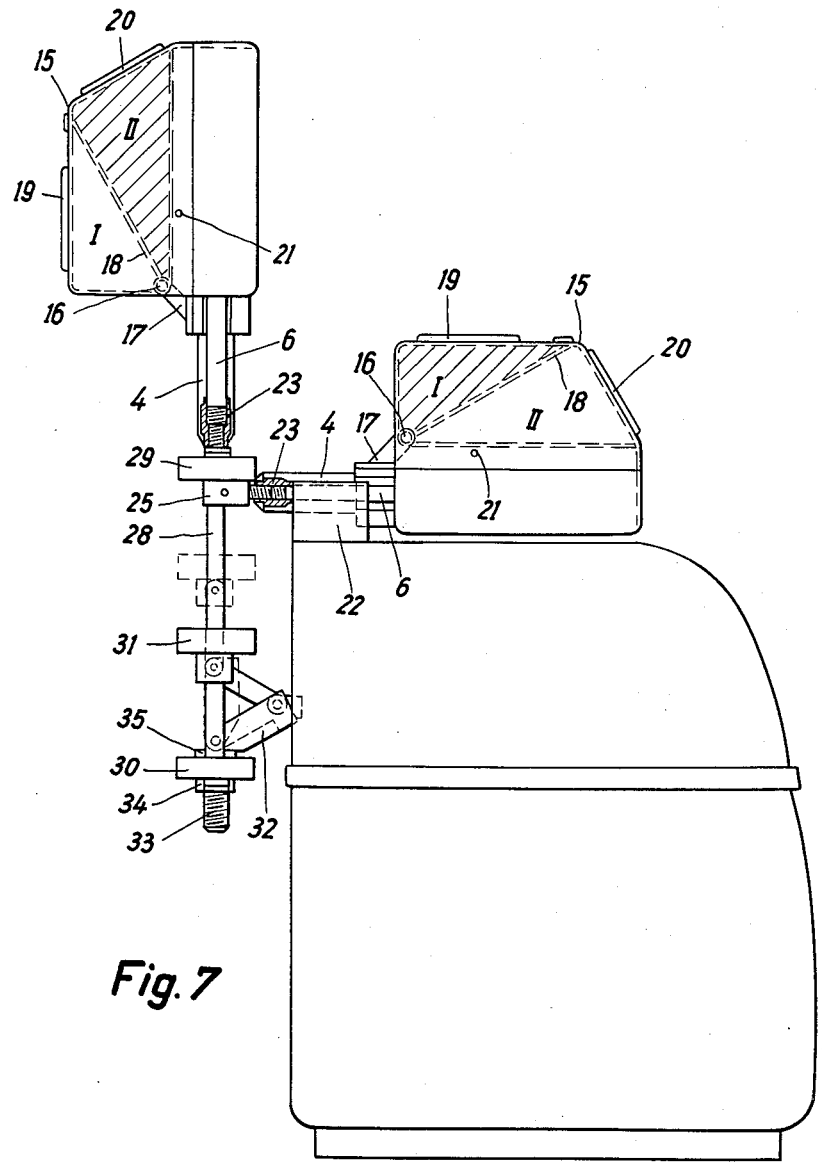
FIGURE 7 is a modification of the present invention similar to that shown in FIGURE 6, with the exception that the mold clamping assembly and one injection casting assembly are arranged in a vertical direction, whereas a second injection casting assembly is arranged in a horizontal position.
Figure 6A:
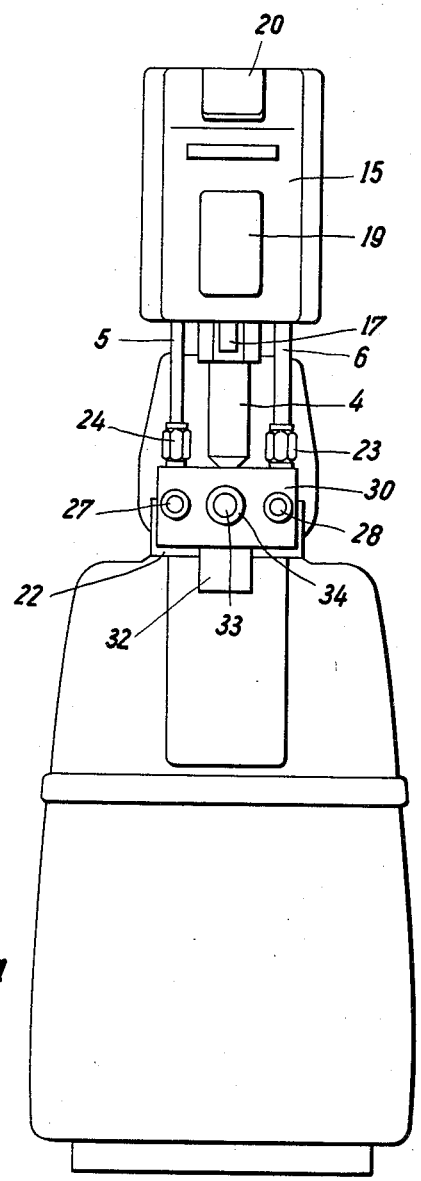
FIGURE 6a is a front end view of the machine shown in FIGURE 6.
Figure 7A:
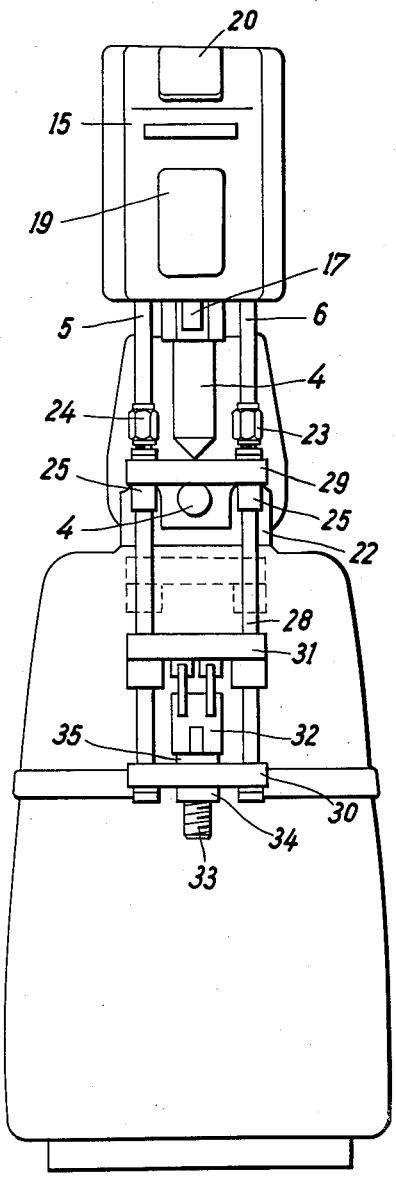
FIGURE 7a is a front end view of the machine of FIGURE 7.

In addition to the above, it is possible to secure two injection molding assemblies to a mold clamping element as illustrated in FIGURES 6 and 7. In the modification shown in FIGURE 6, the first injection molding assembly is secured to the platform of the machine and is further secured to the mold clamping assembly and in line therewith. The second injection molding assembly is arranged vertically and is secured at right angles to the first injection molding assembly and mold clamping assembly. In the modification shown in FIGURE 7, a first injection molding assembly is secured to the platform and to the mold clamping assembly at right angles thereto. The mold clamping assembly is disposed vertically. A second injection molding assembly is secured to said mold clamping assembly and in line therewith. The second injection molding assembly is arranged at right angles to the first. These arrangements are made possible by means of special securing elements described above.

More particularly, there is thus provided an injection molding machine which guarantees the saving of time in the manufacture of moldings or castings which are multi-colored or made of a plurality of materials, members or parts.

It will be understood that the above description of the present invention is susceptible to various modification, changes and adaptations, and the same are intended to be comprehended within the meaning and range of equivalents of the appended claims.

I claim:

1. An injection molding machine, comprising, in combination:
    (a) a mold clamping assembly which is provided with an opening into alignment with which the ingate of a mold held by said clamping assembly may be placed;
    (b) an injection casting assembly;
    (c) a connecting arrangement for connecting said assemblies together into a single rigid composite unit, said connecting arrangement including
        (1) first connecting means for connecting said assemblies so that they are positioned in alignment with each other thus allowing said injection casting assembly to inject material through said opening into a mold ingate in alignment therewith, and
        (2) second connecting means for connecting said assemblies so that they are positioned at right angles to each other thus allowing said injection casting assembly to inject material into a mold ingate located along the separation line of the mold; and
    (d) a support which is common to said assemblies and carries said single rigid composite unit.

2. An injection molding machine according to claim 1 wherein said injection casting assembly contains a two-chamber storage means for casting material and pipe means for feeding said casting material from said storage means to a thermoplastic injection means, said pipe feeding means including a first part disposed so as to always be below said chambers regardless of the positioning of said injection casting assembly and in said casting machine and a second part in communication, via said first part, with one of the two chambers of said storage means, depending on the position of said injection casting assembly.

3. An injection casting machine according to claim 1 provided with a second injection casting assembly for multi-feature casting, said second injection casting assembly being connected to the other two assemblies by said connecting arrangement and constituting part of said single, rigid composite unit, said second injection casting assembly being at right angles to the first-mentioned injection casting assembly.

4. An injection casting machine according to claim 1 wherein said casting assembly has a plasticizing cylinder which is provided with an opening for receipt of granular casting material and said casting assembly further contains a casting material feeding means comprising: a casting material storage means, a horizontally arranged casting material feeding pipe means and vertically arranged casting material conduit means; whereby casting material is delivered from said storage means to said pipe feeding means then to said vertically disposed casting material conduit means and then through an opening in said plasticizing chamber.

5. An injection casting machine according to claim 1 wherein the clamping assembly comprises a pair of guide rods which join front and back platens of the clamping assembly and a movable intermediate platen, said intermediate platen being movable along said guide rods and actuated by a knee joint linkage attached thereto which in turn is actuated by a pressure spindle.

6. An injection casting machine according to claim 1 wherein said casting assembly is provided with a casting material storage means and a feeding pipe means arranged to remain below said storage means in all positions of said injection casting assembly.

7. An injection casting machine according to claim 1 wherein the casting assembly is provided with a casting material storage means having two chambers and casting material feeding means, said casting material feeding means being arranged to remain below said chambers in all positions of said injection casting assembly, said feeding means communicating with one of said chambers when said injection casting assembly is horizontal and with the other of said chambers when said injection casting assembly is vertical.

References Cited in the file of this patent

UNITED STATES PATENTS

| 2,226,408 | Nast | Dec. 24, 1940 |
| 2,438,856 | Knowles | Mar. 30, 1948 |
| 2,447,101 | Stock | Aug. 17, 1948 |
| 2,461,282 | Jobst | Feb. 8, 1949 |
| 2,478,823 | Halbach | Aug. 9, 1949 |
| 2,498,264 | Goldhard | Feb. 21, 1950 |
| 2,649,621 | Moslo | Aug. 25, 1953 |
| 2,711,567 | Knapp | June 28, 1955 |
| 2,807,050 | Roger | Sept. 24, 1957 |

FOREIGN PATENTS

| 736,662 | Great Britain | Sept. 14, 1955 |
| 537,126 | Canada | Feb. 12, 1957 |